No. 768,886. Patented August 30, 1904.

UNITED STATES PATENT OFFICE.

LEOPOLD SPIEGEL, OF CHARLOTTENBURG, GERMANY.

SOLUBLE COMPOUND OF IRON AND ARSENIC AND PROCESS OF MAKING SAME.

SPECIFICATION forming part of Letters Patent No. 768,886, dated August 30, 1904.

Application filed November 6, 1903. Serial No. 180,123. (Specimens.)

*To all whom it may concern:*

Be it known that I, LEOPOLD SPIEGEL, a citizen of the German Empire, residing at 24 Schlüterstrasse, Charlottenburg, in the German Empire, have invented certain new and useful Improvements in Processes of Manufacturing Soluble Compounds Containing Iron and Arsenic; and I do hereby declare the following to be a full, clear, and exact description of the invention, such as will enable others skilled in the art to which it appertains to make and use the same.

Soluble compounds containing arsenic and iron have hitherto been manufactured by evaporating freshly-precipitated hydrated ferrous oxid or proto-carbonate of iron or finely-pulverized spathic iron, together with a solution of glycerin-arsenic acid, in vessels from which air is excluded; but these methods are both complicated and expensive. If resorted to, it is first necessary to prepare artificially the solutions from which the soluble compounde are to be obtained, and, moreover, the use of glycerin is necessary in order to obtain soluble residues by the evaporating process.

It is the object of this invention to simplify and render more economical the process of obtaining such soluble compounds by avoiding the artificial preparation of the ferro-arsenic salts and also eliminating the use of glycerin. I accomplish this by employing the natural solutions of iron and arsenic—for example, natural mineral waters, such as are found at Levico and Roncegno in Tyrol and in other places—and by treating them in the manner hereinafter described. This process makes it possible to obtain dry preparations containing iron and arsenic which have, owing to their solubility, a high therapeutic value. The evaporation of these natural solutions and the drying of the residue for this purpose is carried out in vessels from which the air is excluded. If such natural solutions or mineral waters were evaporated under the ordinary conditions, a residue would be obtained which would contain the iron and the arsenic no longer in their original soluble condition, but in insoluble form, the iron having been changed from its original ferrous condition into a ferric one. For this reason it has hitherto been impossible to obtain high-grade dry preparation from the evaporation of such waters. The compound of iron and arsenic as it was originally contained in the water, as far as it can be identified by its solubility and chemical reactions, is obtained if the evaporation and drying of the residue of the particular mineral water takes place in vessels from which the air is excluded and through which in some cases a weak current of indifferent gas—for instance, carbonic-acid gas—is passed. The use of carbonic-acid gas is of special value if the mineral water contains bicarbonates which without the carbonic-acid gas would be converted into insoluble carbonates.

Example: Mineral water which contains iron and arsenic and carbonic-acid gas—for instance, Levico water—is evaporated to dryness in vessels from which air is excluded and through which a weak current of an indifferent gas—for instance, carbonic-acid gas—is passed. The dry residue of powder thus obtained is ready for use without further treatment. It is a stable salt or compound which may be stored, packed, and handled and put up in bottles, boxes, or other receptacles for use as desired.

Hitherto, in order to obtain ferro-arsenic compounds as above, it has been necessary to add or employ glycerin in order to avoid oxidation of the ferrous constituents and at the same time to prevent the disassociation of the said ferro-arsenic compound. I have found that when using the natural mineral waters above described such use of glycerin may be dispensed with when evaporating in the absence of air or free oxygen and that under such treatment the original ferro-arsenic compound contained in the mineral water will be obtained in an unoxidized and undecomposed condition, presenting a stable ferro-arsenic salt which is freely soluble in water.

A chemical analysis of the residue obtained according to my process from Levico water showed that in one hundred pints, by weight, of the said residue there are contained 18.31 parts, by weight, ferrous oxid having the formula $FeO$ and 0.1007 parts, by weight, of ferrous arsenite having the formula $FeHAsO_3$. The remaining ingredients comprise various salts and organic bodies which are not important and for which it would be difficult and in part impossible to give the formulæ.

What I claim, and desire to secure by Letters Patent, is—

1. A process of manufacturing soluble compounds of iron and arsenic, which consists in evaporating the natural mineral waters containing iron and arsenic in the absence of free oxygen.

2. A process of manufacturing soluble compounds of iron and arsenic, which consists in evaporating the natural mineral waters containing iron and arsenic in the absence of air.

3. A process of manufacturing soluble compounds of iron and arsenic, which consists in evaporating natural mineral waters containing iron and arsenic in the absence of air and in the presence of carbonic-acid gas.

4. As a new chemical product a stable mass obtained from natural mineral waters containing ferrous oxid and ferrous arsenite of the formula $FeHAsO_3$ and being freely soluble in water.

In testimony whereof I have affixed my signature to this specification in the presence of two witnesses.

LEOPOLD SPIEGEL.

Witnesses:
 HENRY HASPER,
 WOLDEMAR HAUPT.